United States Patent
Jahr

(10) Patent No.: US 10,805,274 B2
(45) Date of Patent: Oct. 13, 2020

(54) CENTRAL MANAGEMENT PLATFORM WITHOUT USER MANAGEMENT

(71) Applicant: SAP SE, Walldorf (DE)

(72) Inventor: Andreas Jahr, Karlsruhe (DE)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 16/211,303

(22) Filed: Dec. 6, 2018

(65) Prior Publication Data

US 2020/0186503 A1 Jun. 11, 2020

(51) Int. Cl.
*H04L 29/06* (2006.01)
*H04L 29/08* (2006.01)
*H04L 9/14* (2006.01)

(52) U.S. Cl.
CPC ............ *H04L 63/0428* (2013.01); *H04L 9/14* (2013.01); *H04L 67/141* (2013.01)

(58) Field of Classification Search
CPC ...... H04L 63/0428; H04L 67/141; H04L 9/14
See application file for complete search history.

(56) References Cited

U.S. PATENT DOCUMENTS

| | | | |
|---|---|---|---|
| 8,392,908 B2 | 3/2013 | Laicher et al. | |
| 8,671,392 B2 | 3/2014 | Jahr et al. | |
| 9,026,502 B2 | 5/2015 | Driesen et al. | |
| 9,183,123 B2 | 11/2015 | Spektor et al. | |
| 9,189,226 B2 | 11/2015 | Driesen et al. | |
| 9,195,453 B1 | 11/2015 | Giammaria et al. | |
| 9,276,825 B2 | 3/2016 | Misovski et al. | |
| 9,336,060 B2 | 5/2016 | Nori et al. | |
| 9,489,647 B2 | 11/2016 | Martinez et al. | |
| 9,639,448 B2 | 5/2017 | Gebhard et al. | |
| 9,678,740 B2 | 6/2017 | Heine et al. | |
| 9,722,890 B2 | 8/2017 | Jahr et al. | |
| 2012/0284506 A1* | 11/2012 | Kravitz | G06Q 40/00 713/151 |
| 2013/0159427 A1 | 6/2013 | Jahr et al. | |
| 2013/0191820 A1 | 7/2013 | Jahr et al. | |
| 2014/0379669 A1 | 12/2014 | Driesen et al. | |
| 2014/0380265 A1 | 12/2014 | Driesen et al. | |
| 2015/0100684 A1 | 4/2015 | Maes et al. | |
| 2015/0295844 A1 | 10/2015 | Perreira et al. | |
| 2016/0226992 A1 | 8/2016 | Akcin | |
| 2016/0241444 A1 | 8/2016 | Maes | |
| 2017/0061348 A1 | 3/2017 | Mack et al. | |
| 2017/0109137 A1 | 4/2017 | Subramanian et al. | |
| 2017/0109536 A1 | 4/2017 | Stopel et al. | |
| 2017/0115976 A1 | 4/2017 | Mills | |
| 2018/0254018 A1* | 9/2018 | Cherkashin | G06F 3/044 |

OTHER PUBLICATIONS

U.S. Appl. No. 15/812,248, Jahr, Andreas, filed Nov. 14, 2017.

* cited by examiner

*Primary Examiner* — Joseph P Hirl
*Assistant Examiner* — Chi D Nguy
(74) *Attorney, Agent, or Firm* — Fish & Richardson P.C.

(57) ABSTRACT

Methods, systems, and computer-readable storage media for central management of multiple landscapes using a central management platform that is absent user management functionality.

20 Claims, 6 Drawing Sheets

CENTRAL MANAGEMENT PLATFORM WITHOUT USER MANAGEMENT

BACKGROUND

Central management systems can be used to manage multiple landscapes. Example landscapes can include on-premise, and cloud. Traditional central management systems are heavy in terms of computing resources, and memory required to operate, and are complex. For example, central management systems include user management components to perform operations in managed landscapes (e.g., lifecycle operations, modify configurations). Traditional central management systems, however, are complex, and require relatively significant computing resources (e.g., processors, memory).

SUMMARY

Implementations of the present disclosure are directed to central management systems for managing multiple landscapes. More particularly, implementations of the present disclosure are directed to a central management platform that is absent user management functionality, and secure key storage for managing multiple landscapes.

In some implementations, actions include receiving, by a central management platform that is absent user management functionality, a request for access to a managed object of a landscape of a plurality of landscapes, in response to the request, establishing a connection between the central management platform, and a host of the managed object by: in response to receiving an encrypted response from the host of the managed object, establishing a semaphore within the central management system to temporarily inhibit connection creation, providing the encrypted response to a client-side device from the central management platform, the request having originated from the client-side device, receiving, from the client-side device, a plain-text value that is determined from the encrypted response using a private key provided at the client-side device, and releasing the semaphore to enable establishment of the connection by execution of one or more operations between the central management system, and the host based on the plain-text value, in response to establishment of the connection, requesting logon credentials from the client-side device, and facilitating logon of a user to the host based on the logon credentials to enable user access to the managed object. Other implementations of this aspect include corresponding systems, apparatus, and computer programs, configured to perform the actions of the methods, encoded on computer storage devices.

These and other implementations can each optionally include one or more of the following features: the request includes a unique identifier assigned to the managed object and a process type, actions further include determining a login method for the managed object based on a managed object model stored in the central management platform, the connection being established based on the login method; the encrypted response includes a random number that is encrypted using a public key provided by the client-side device; establishing a connection between the central management platform and the host is at least partially performed by a session creator of the central management platform; the session creator selectively sets and releases the semaphore; and authorization is delegated to an operating system for granting write access to a configuration of the central management platform.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to central management systems for managing multiple landscapes. More particularly, implementations of the present disclosure are directed to a central management platform that is absent user management functionality, and secure key storage for managing multiple landscapes. Implementations can include actions of receiving, by a central management platform that is absent user management functionality, a request for access to a managed object of a landscape of a plurality of landscapes, in response to the request, establishing a connection between the central management platform, and a host of the managed object by: in response to receiving an encrypted response from the host of the managed object, establishing a semaphore within the central management system to temporarily inhibit connection creation, providing the encrypted response to a client-side device from the central management platform, the request having originated from the client-side device, receiving, from the client-side device, a plain-text value that is determined from the encrypted response using a private key provided at the client-side device, and releasing the semaphore to enable establishment of the connection by execution of one or more operations between the central management system, and the host based on the plain-text value, in response to establishment of the connection, requesting logon credentials from the client-side device, and facilitating logon of a user to the host based on the logon credentials to enable user access to the managed object.

As described in further detail herein, implementations of the present disclosure provide a central management platform with reduced complexity, and resource consumption. In some examples, the central management platform of the present disclosure can be described as slim, which indicates, for example, that the central management platform does not require a complex implementation using a full-blown, complex, resource-hungry application server. In some implementations, complexity reduction is at least partially provided through the absence of user management. That is, the central management platform of the present disclosure is userless, because it does not provide for user management. In some implementations, complexity reduction is at least partially provided by lack of secure storage for access credentials (e.g., username, password, private keys) to access managed objects through the central system. Even in the absence of user management (userless), and secure store, the central management platform of the present disclosure enables, among other things, secure process execution, secure local configurations, security of private keys, recovery from server crashes, and attachment of new users to an already running operation (e.g. for monitoring, and/or operation take over.

Figure 1:
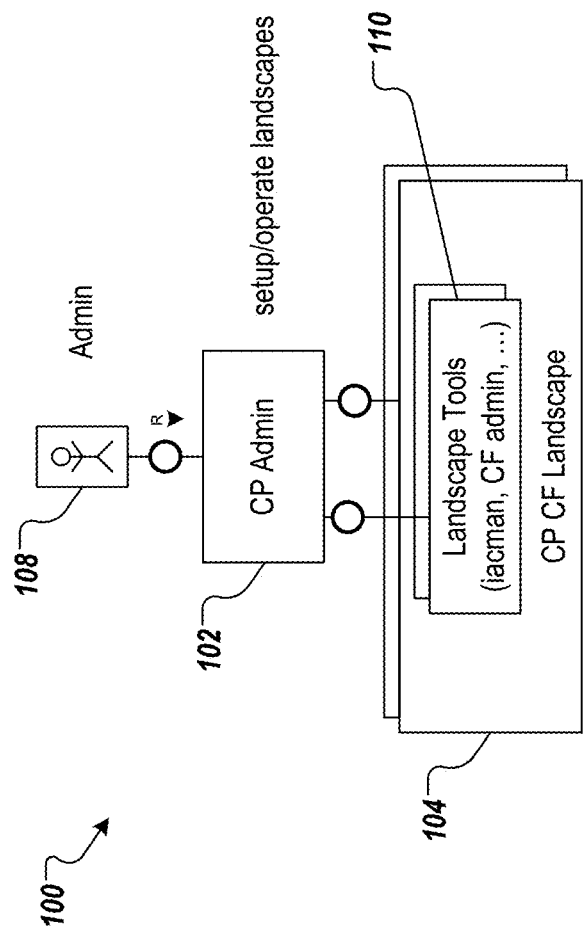
FIG. 1 depicts an example conceptual architecture in accordance with implementations of the present disclosure.

FIG. 1 depicts an example conceptual architecture 100 in accordance with implementations of the present disclosure. In the depicted example, the example conceptual architecture 100 includes a central management platform 102 that enables management of multiple landscapes 104. The central management platform 102 resides outside of the multiple landscapes. In accordance with implementations of the present disclosure, the central management platform 102 is slim (e.g., in terms of computing resources, and functionality). Further, the central management platform 102 enables low-to-medium skilled users 106 (e.g., administrators) at public cloud providers, and private cloud (on-premise) providers to manage the landscapes 104. To achieve this, and as described in further detail herein, the focus is on tasks for the landscape lifecycle (e.g. upgrade), administration (e.g. rolling application restart), and configuration (e.g., scale out) tasks. Further, the central management platform 102 interfaces with existing landscape tools 110, and provides simplified UIs and procedures.

In some examples, a landscape can be described as an entity that groups all the different services and systems. The services and the landscape are managed by the userless management platform of the present disclosure. An example includes, without limitation, the entirety of all services and VMs that are in the scope of one OpenStack tenant. In some examples, a managed object is an entity that is managed from the userless management platform. Examples include, without limitation, the landscape as a whole, the services inside of the landscape, and service components. In some examples, process can refer to a management process (e.g., business processes, tasks of IT management). Examples include, without limitation, updating, provisioning, monitoring, and root cause analysis. In some examples, process context is the state of the management process that is needed during its execution by the userless management server that is required, but not provided by the workflow engine. Its primary purpose is to keep track of the authorized and opened connections to the managed objects, such that the user is not asked for each process step that requires landscape access for the credentials to open its own connection.

Figure 2:
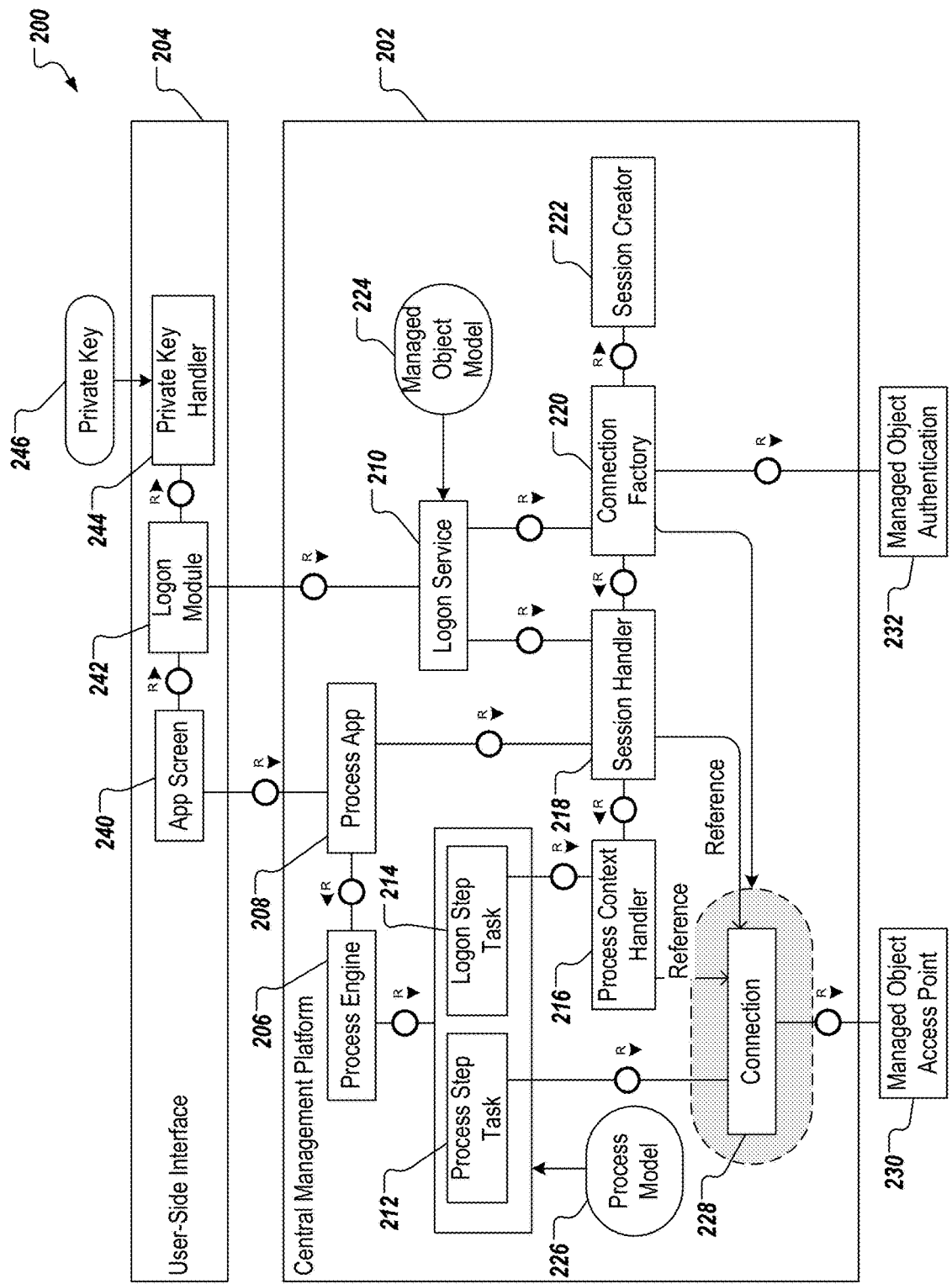
FIG. 2 depicts an example component architecture that can be used to execute implementations of the present disclosure.

FIG. 2 depicts an example component architecture 200 that can be used to execute implementations of the present disclosure. The example component architecture 200 includes a central management platform 202 in accordance with implementations of the present disclosure (e.g., the central management platform 102 of FIG. 1), and a user-side interface 204 (e.g., a browser-based interface). In some examples, the user-side interface 204 executes on a client-side device (e.g., a laptop computer, a desktop computer), and enables a user (e.g., the user 108 of FIG. 1) to interact with the central management platform 202 to perform landscape management tasks.

In the example of FIG. 2, the central management platform 202 includes a process engine 206, a process application 208, a logon service 210, a process step task 212, a logon step task 214, a process context handler 216, a session handler 218, a connection factory 220, and a session creator 222. The central management platform 202 further includes a managed object model 224, a process model 226, and a connection 228. In some example, and as described in further detail herein, the central management platform 202 interacts with a managed object access point 230, and a managed object authentication 232. In the example of FIG. 2, the user-side interface 204 includes an application screen 240, a logon module 242, and a private key handler 244 that receives a private key 246, as described in further detail herein.

In some implementations, the central management platform 202 leverages the managed object model 224, and the process model 226 to ensure correct, userless operation (i.e., operation without user management). A plurality of managed object models 224 can be provided, each managed object model 224 representing a respective managed object. A plurality of process models 226 can be provided, each process model 226 representing a respective process. In some examples, the managed object model 224, and the process model 226 are defined during designtime. In some examples, and as described in further detail herein, the managed object model 224, and the process model 226 are provided as at least part of configurations of the central management platform 202, which can be accessed and edited during runtime of the central management platform 202.

In some implementations, the managed object model 224 records configuration information about how a managed object is accessed. Example configuration information includes, without limitation, endpoint types, concrete endpoints, and the logon method, for which the respective managed object is enabled. For example, each managed object model 224 includes an identifier assigned to the respective managed object (e.g., MO_ID), an endpoint type (e.g., SSH, REST), an endpoint address (e.g., string address), and a logon method (e.g., 2FA (two-factor authentication), CRED, PK).

In some implementations, each managed object model 224 corresponds to one or more process models 226. In some examples, the process model 226 records designtime information, of which steps are logon steps (e.g., that potentially need re-execution). In some examples, the process model 226 is linked to the managed object model(s) 224 through the model identifier (e.g., MO_ID) in order to retrieve the logon method that is needed. In some examples, the process model 226 includes a process definition, one or more process steps, and one or more process instances. In some examples, the process definition includes a process type identifier, and a description. In some examples, each process step includes a step identifier, a step type (e.g., logon, normal), and a monitoring parameters (e.g., Boolean value). In some examples, each process instance includes a process instance identifier, and a respective managed object identifier (MO_ID).

The example component architecture 200 of FIG. 2 is described in further detail herein with reference to a set of process that use the depicted components. Example processes include, without limitation, logging on to (logon to) a managed object from an application, logon to the managed object from a process, reconnect to a process, handle expired connections to a managed object, establish a connection (e.g., a secure socket shell (SSH) connection) with a private key (e.g., the private key 246), and applying configuration changes to the central management platform 202. In some examples, audit logging (e.g., logging all accesses to the managed objects in a revision-safe manner for clearly identifiable users for later audit purposes) can be delegated to the managed objects themselves. In some examples, information about the name and access points of the managed objects, and the processes to be carried out for the managed objects can be treated as public information. Consequently, read-access to such information need not be protected.

With regard to logon to a managed object from an application, a prerequisite can include that the managed object, and the process have been preselected. In some implementations, an application is invoked using the user-side interface 204, and the application screen 240 is displayed. The application screen 240 provides one or more user interfaces (UIs), through which a user (e.g., administrator) can interact with the central management platform 202. In some examples, a request is sent to the process application 208 (application backend), the request including a unique identifier assigned to the managed object (e.g., MO_ID), and a process type. In response to the request, the process application 208 calls the session handler 218 to establish a connection (e.g., hypertext transfer protocol (HTTP) session). In some examples, the connection is for the endpoint defined for the process and landscape with the session handler 218 as the target. If no connection object is available, then the process application 208 returns an error with the required login method (e.g., for the requested endpoint). Establishing a connection is described in further detail herein.

After the connection is established, the logon module 242 is called (e.g., automatically by the application), which in turn calls the logon service 210 that presents a logon screen. That is, for example, the logon screen is displayed as a UI within the application screen 240. In some examples, the user enters credentials, and/or a token, which are provided to the logon service 210. In some examples, the logon service 210 creates the connection 228, and adds the connection 228 to the session handler 218. If the credentials are valid (e.g., successful login), the application repeats the original request to the process application 208. The process application 208 finds a valid connection (e.g., the connection 228 through the session handler 218) for the implicitly requested endpoint, and can access the endpoint. In this case, the endpoint includes the managed object access point 230.

With regard to logon to a managed object from a process, in some examples, the user initiates a process through the application screen 240. This results in creation of a process context. More particularly, in response to the user request, the process application 208 initiates the process at the process engine 206, and returns a unique identifier assigned to the process (e.g., process_ID). The process engine 206 initiates the logon steps of the process. In some examples, the logon steps check the process context (e.g., the process identifier at the process context handler 216) to determine whether connections to the requested endpoint are available. If a connection is not available, user input with logon type is requested. If a connection is available, the connection can be reused on the context (HTTP context) level.

In some examples, the application monitors the process execution for user input, and detects a requested logon step. In response, the application invokes the logon module 242 with the requested logon method, endpoint, and process identifier. The logon module calls the logon service 210, which creates a connection (e.g., in hand with the connection factory 220), and registers the connection to the process context. In some examples, if a process context does not exist, a process context is created, and the connection is associated with the process context.

The success of the logon (e.g., the successful creation of a connection to the managed object access point 230) is returned to the application, which in turn returns a success indicator to the logon step task 214. The logon step task 214 again checks the process context at the process context handler 216, and retrieves the connection reference, the connection reference is passed on as a parameter for subsequent process steps. In some examples, a unique connection identifier (e.g., connection_ID) can be provided, which identifies the connection to the managed object. In some examples, without connection identifier, it is assumed that the managed endpoint is unique for the process.

With regard to reconnecting to a process, in some examples, if a user shuts the user-side interface 204, or another user wants to take over the process, the process context still exists. However, the process context is not attached to any session. That is, the session is already expired, or explicitly deleted. In some implementations, upon navigated to a relevant UI in the application screen 240 (e.g., after having selected the operation, and the managed object), the user is presented with the currently running process(es). Because there is no association between the connection context, and the process context, the user is asked by the UI whether to only monitor, or to take over the running processes. If the user indicates as such, the above-described process for logging onto a managed object from a process is performed for the particular user.

With regard to just monitoring, the logon steps that exhibit a monitoring flag being true are performed. In this case, only a subset of the entirety of logon steps may need to be performed. It depends on the process as designed, as to whether a subset is already sufficient to qualify the user to monitor the process. It can be noted that monitoring does not mean that connections to the managed objects (and thus the associated authentication and authorization) already used during the process execution would be exchanged with the new connections. Instead, the already existing connections are continued to be used. However, now the existing process context is attached to the session on behalf of the new user. This new reference to the already existing process context is marked as monitoring implying only read access to the current process until its termination. With regard to process takeover, this involves changing the state of the process. In case of changing the state of the process (e.g., entering or changing process parameters), a full authentication would be required. Consequently, all connections to the managed objects required for the execution are exchanged. In this manner, the audit log at the managed object remains consistent. For either monitoring, or take over, if the session has expired, the user reestablishes a session using the procedures described herein.

With regard to handling expired connections to a managed object, in some examples, if a connection expires, the respective process step, or the process application 208 throws an exception. In response, only the corresponding logon step is carried out again. The user-side interface 204 requests the process application 208 to re-execute the corresponding logon step. The process is modeled, such that an event leads again to the re-execution of the login steps (or even a specific log-in step). The erroneous step is re-executed.

With regard to establishing a connection with a private key, this results when the requested logon method is an SSH connection using the private key 246. In some examples, an SSH connection is needed in order to gain administrative access to, for example, managed object hosts, or jumpboxes that in turn give access to tools, and hosts only exposed in the managed object internal network. SSH connections are often established by means of private keys that identify the user.

In some implementations, access to a host is achieved using a private/public key pair of a user. The public key is assumed to be already present on the host. The access uniform resource locator (URL) is known at design-time, which means that the URL is part of the configuration. In a traditional SSH authentication process, the client sends an identifier for the key pair that is to be authenticated with the server. The server uses the identifier to check an authorized keys file of the account that the client is attempting to log into for the identifier. If a public key with a matching identifier is found in the authorized keys file, the server generates a random number, uses the public key to encrypt the number, and sends encrypted random number to the client. If the client actually has the associated private key, it will be able to decrypt the message using the key, revealing the random number. The client combines the random number with the shared session key that is being used to encrypt the communication, and calculates a hash (e.g., MD5 hash) of this value. The client sends the hash back to the server as response to the encrypted message (e.g., the server's message with the encrypted random number). The server uses the same shared session key, and the random number that it sent to the client to calculate the hash value on its own. It compares its own calculation to the one that the client sent back. If the two hash values match, this proves that the client was in possession of the private key, and the client is authenticated.

The traditional SSH authentication, however, has a disadvantage. For example, for security reasons the private key should not leave the place where it is stored (i.e., it should remain on the host where the browser of the end user runs). On the other hand, and in accordance with implementations of the present disclosure, the central management platform needs to programmatically create an SSH connection on behalf of the user from the platform host. SSH libraries would expect the private key to be handed over into the program using the library. This would mean that the private key would have to be transferred from the browser host to the platform host, which should be avoided.

In view of this, implementations of the present disclosure adjust the SSH library, such that decryption of the encrypted random number is not executed by the library. Instead, decryption of the encrypted random number is by the central management tool web application running in the user-side interface (e.g., the browser).

Figure 3:
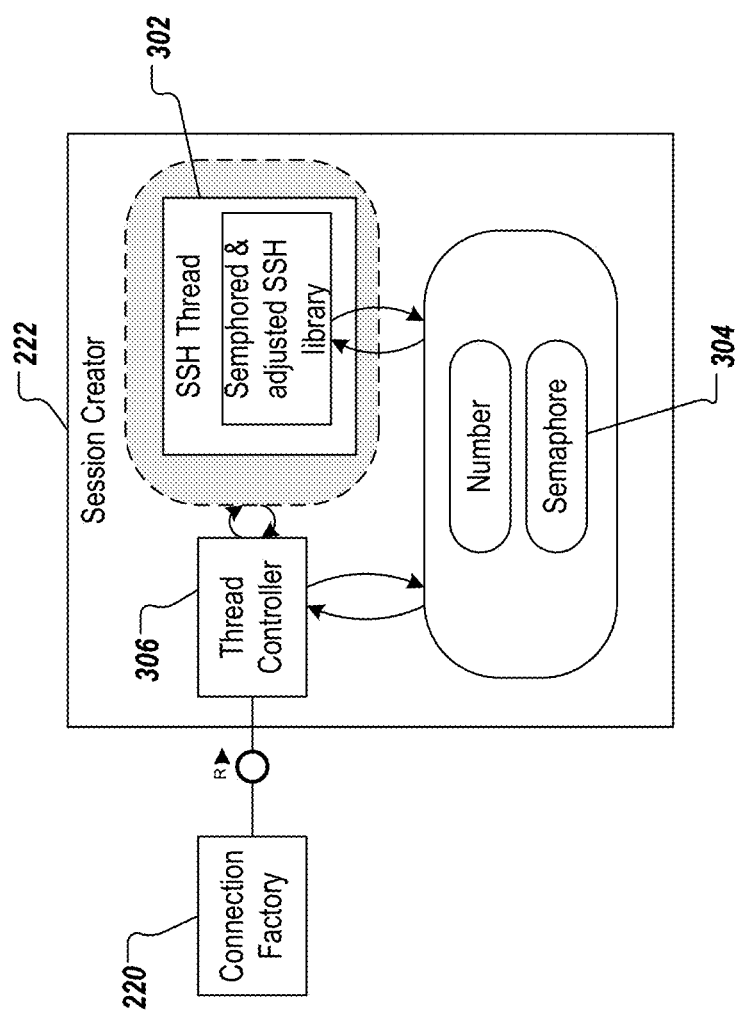
FIG. 3 depicts example secure connection components in accordance with implementations of the present disclosure.

In further detail, and with reference to FIGS. 2 and 3, the logon module 242 is called by a UI of the application, which requests the local private key location and passphrase. The logon module 242 extracts the key-pair identifier from the private key, and invokes the logon service 210 to create the SSH connection for the key-pair identifier with the modified SSH library. That is, the identifier for the key-pair that is to be authenticated with the server is sent to the server. The server uses the identifier to check an authorized keys file of the account that the client is attempting to log into for the identifier. If a public key with a matching identifier is found in the authorized keys file, the server generates a random number, uses the public key to encrypt the number, and sends encrypted random number back.

In some implementations, and with particular reference to FIG. 3, the SSH connection creation (e.g., in the session creator 222) can be run in a thread 302, and a semaphore 304 can be established. In some examples, the semaphore 304 suspends further connection creation execution once the encrypted random number is received from the server to wait for UI-side decryption, and an object (number) to transfer the number between the adjusted SSH library, and the main execution thread of the platform (a thread controller 306). The SSH thread is added as a reference to the session handler 218 until the UI comes back with the decrypted number.

In further detail, the logon service 210 provides the encrypted random number back to the user-side interface 204. That is, the encrypted random number is returned to the logon service 210 from the connection factory 220 and the session creator 222, and sends the encrypted random number to the user-side interface 204. In some examples, the private key handler 244 decrypts the encrypted random number, and returns the random number (in plain-text) to the process application 208. In some examples, the process application 208 receives the random number, and calls the connection factory 220 to execute the remainder of the authentication process. This is done by retrieving the thread 302 from the session handler 218, signaling the semaphore 304, and thus triggering the continuation of the execution of the modified SSH library to calculate the required hash (e.g., combining the random number with the shared session key that is being used to encrypt the communication, and calculates a hash of the combined value). As described above, the hash is sent to the server, which recalculates the hash to confirm authenticity of the requesting client (e.g., the central management platform 202).

Figure 4:
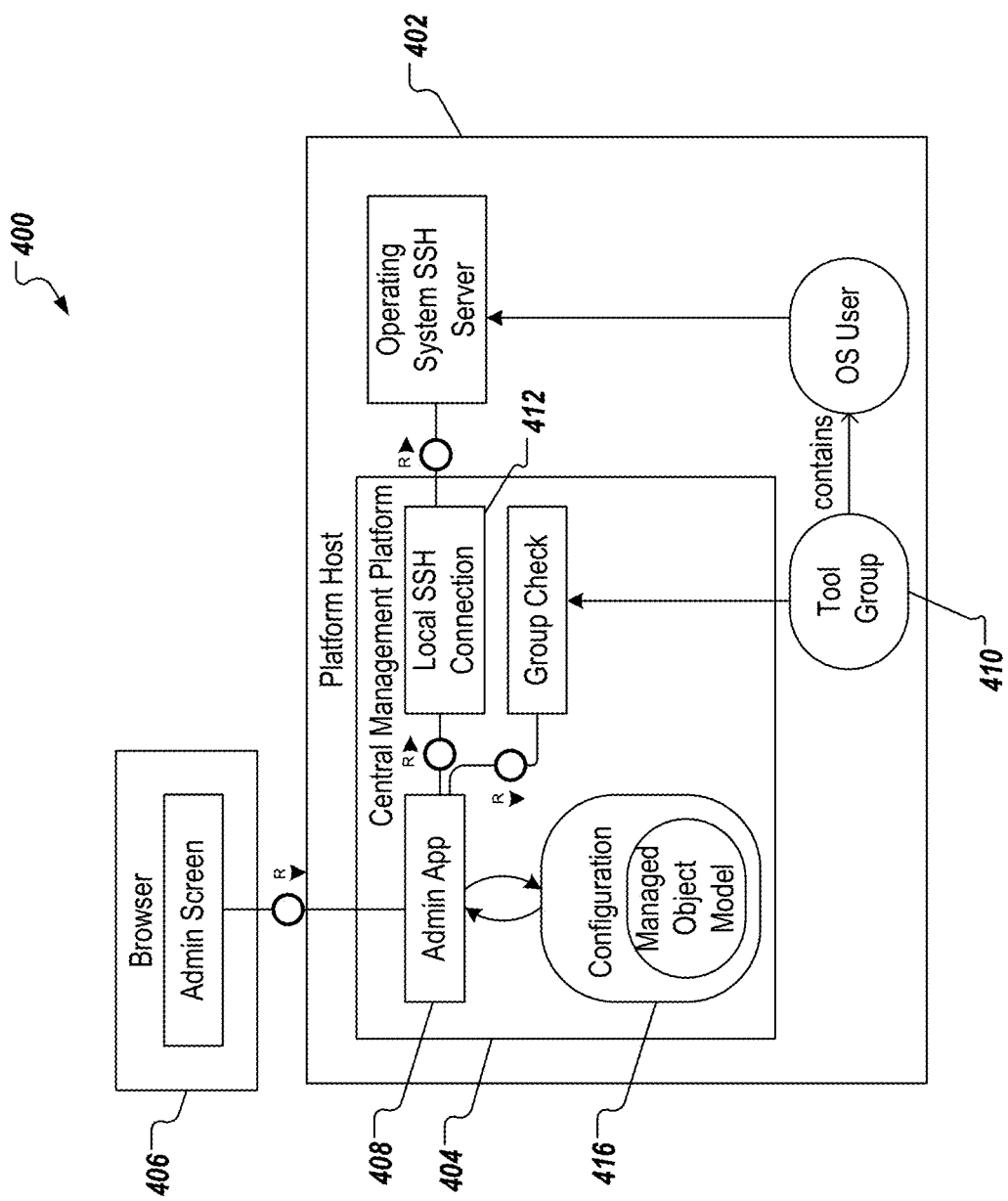
FIG. 4 depicts an example configuration authorization architecture in accordance with implementations of the present disclosure.

Applying configuration changes is described in further detail herein with reference to FIG. 4, which depicts a configuration authorization architecture 400 in accordance with implementations of the present disclosure. The generalized architecture 400 includes a platform host 402, which hosts a central management platform 404 (e.g., the central management platform 202 of FIG. 2) of the present disclosure, and a user-side interface 406 (e.g., the user-side interface 204 of FIG. 2).

Although the central management platform 404 is user-less, as described herein, any configuration changes (e.g. the addition of new managed objects) are not possible anonymously. Consequently, the configuration of the central management platform 404 is protected for write access. In some examples, this protection is achieved by asking for operating system (OS) user credentials. For example, a UI asks the user for the OS user credentials, and passes the credentials over to an administrator application 408. The administrator application 408 checks whether the user is part of the a management tool group 410. The administrator application 408 establishes a local SSH session 412 between the central management platform 404, and the platform host 402. The credentials are used to establish the local SSH session 412. If the local SSH session 412 can be created successfully, the user was authenticated successfully, and write access to configurations 416 of the central management platform 404 is granted. In this manner, the user can edit parameters of the configurations 416 (e.g., the models).

Figure 5:
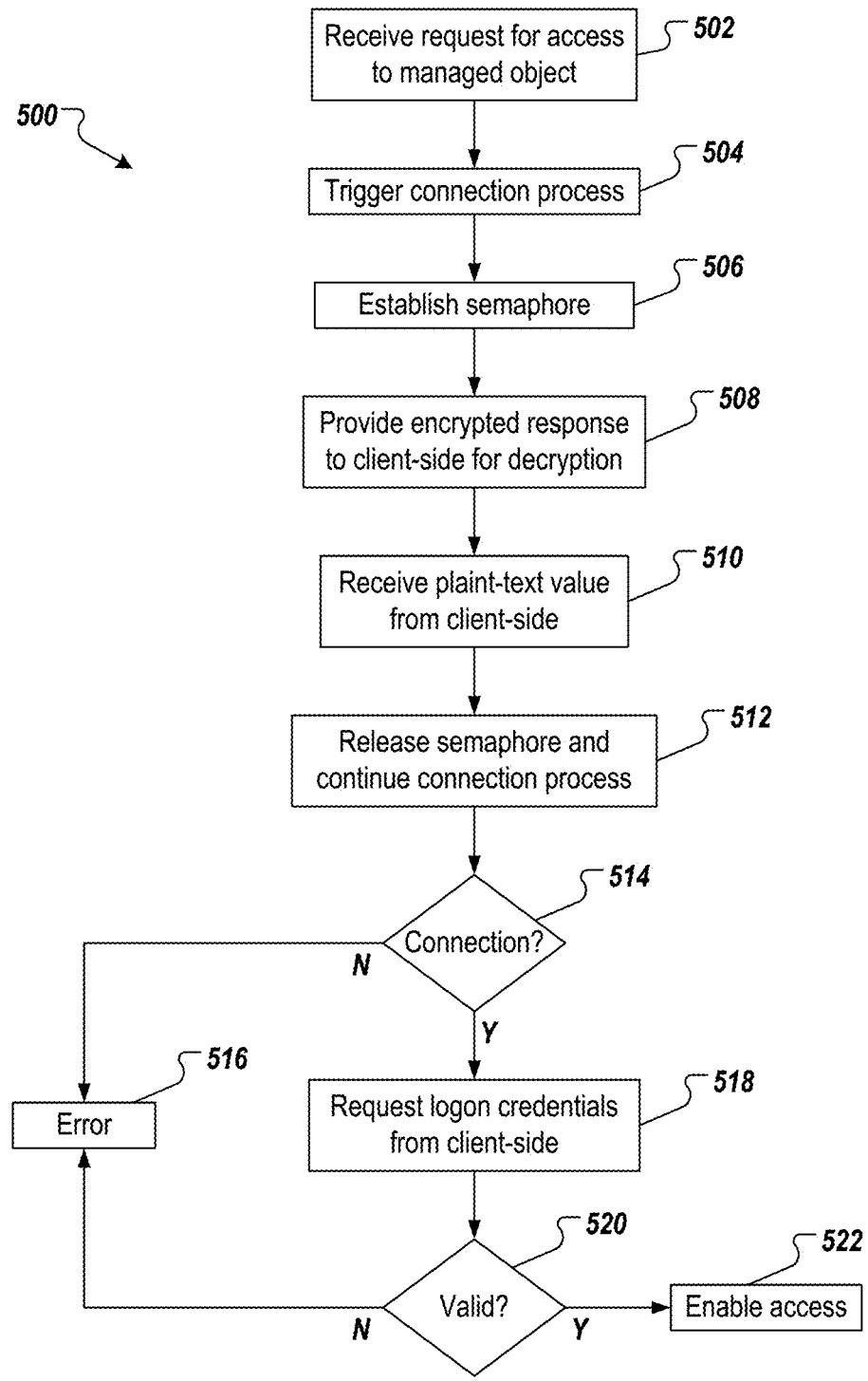
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. For example, the example process 500 can be executed by an central management platform of the present disclosure.

A request for access to a managed object is received (502). For example, a user (e.g., administrator) interacts with the user-side interface 204 (e.g., browser) to request access. In some examples, and as described herein, a request is sent to the process application 208, the request including a unique identifier assigned to the managed object (e.g., MO_ID), and a process type. In response to the request, the process application 208 calls the session handler 218 to establish a connection (e.g., hypertext transfer protocol (HTTP) session).

A connection process is triggered (504). For example, and as described herein, the logon module 242 requests the local private key location and passphrase, extracts the key-pair identifier from the private key, and invokes the logon service 210 to create the SSH connection for the key-pair identifier with the modified SSH library. That is, the identifier for the key-pair that is to be authenticated with the server is sent to the server. The server uses the identifier to check an authorized keys file of the account that the client is attempting to log into for the identifier. If a public key with a matching identifier is found in the authorized keys file, the server generates a random number, uses the public key to encrypt the number, and sends an encrypted response (e.g., encrypted random number) back to the central management platform 202.

A semaphore is established (506). For example, and as described herein with reference to FIGS. 2 and 3, the SSH connection creation (e.g., in the session creator 222) can be run in the thread 302, and a semaphore 304 can be established. In some examples, the semaphore 304 suspends further connection creation execution once the encrypted response is received from the server to wait for UI-side decryption. The encrypted response is provided to the client-side for decryption (508). For example, the logon service 210 provides the encrypted response back to the user-side interface 204. That is, the encrypted response is returned to the logon service 210 from the connection factory 220 and the session creator 222, and sends the encrypted response to the user-side interface 204. In some examples, the private key handler 244 decrypts the encrypted response to provide a plain-text value (e.g., the random number).

The plain-text value is received from the client-side (510). For example, the user-side interface 204 returns the plain-text value (e.g., the random number) to the process application 208 of the central management platform 202, which calls the connection factory 220 to execute the remainder of the authentication process. The semaphore is released, and the connection process continues (512). For example, and as described in further detail herein, the semaphore 304 is released, which triggers continuation of the execution of the modified SSH library to calculate a hash. In some examples, the hash is provided by combining the random number with the shared session key that is being used to encrypt the communication, and calculating a hash of the combined value.

It is determined whether the connection has been established (514). For example, and as described herein, the server receives the hash from the central management platform 202, and uses the same shared session key, and the random number that it sent to the central management platform 202 to calculate the hash value on its own. It compares its own calculation to the one that the central management platform 202 returned. If the two hash values match, this proves that the central management platform 202 had access to the private key, and the central management platform 202 is authenticated. If the connection has not been established, an error is signaled (516).

If the connection has been established, a logon credentials are requested from the client-side, and it is determined whether the logon credentials are valid (520). For example, and as described herein, the connection is established, the logon module 242 is called (e.g., automatically by the application), which in turn calls the logon service 210 that presents a logon screen. That is, for example, the logon screen is displayed as a UI within the application screen 240. In some examples, the user enters credentials, and/or a token, which are provided to the logon service 210. In some examples, the logon service 210 creates the connection 228, and adds the connection 228 to the session handler 218. If the logon credentials are not valid, an error is signaled (516).

If the logon credentials are valid, access is enabled to the managed object (522). For example, and as described herein, the application repeats the original request for access to the managed object to the process application 208. The process application 208 finds a valid connection (e.g., the connection 228 through the session handler 218) for the implicitly requested endpoint, and can access the endpoint. In this case, the endpoint includes the managed object access point 230.

Figure 6:
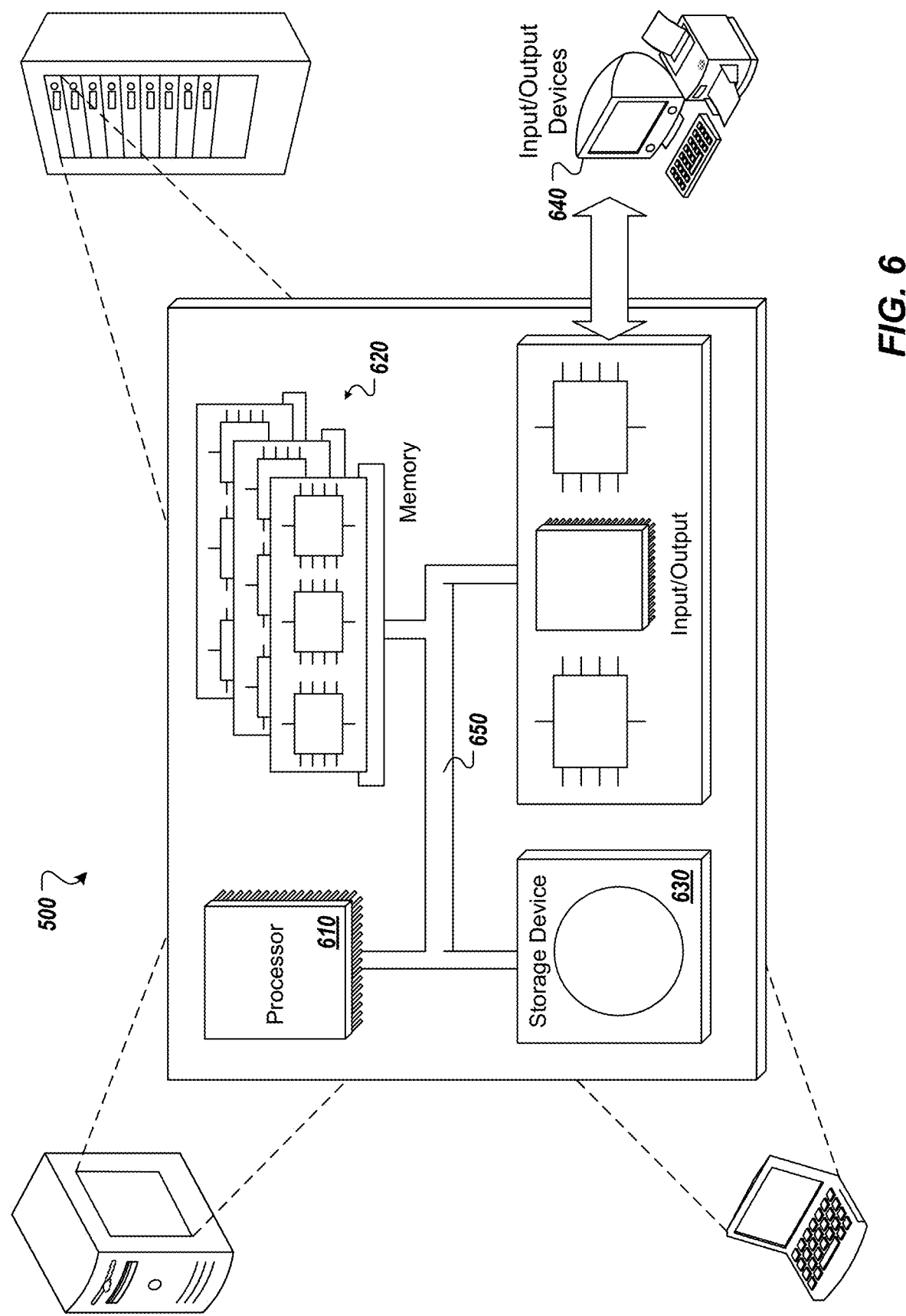
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for central management of multiple landscapes, the method being executed by one or more processors and comprising:
   receiving, by a central management platform that is absent user management functionality, a request for access to a managed object of a landscape of a plurality of landscapes;
   in response to the request, establishing a connection between the central management platform, and a host of the managed object by:
      in response to receiving an encrypted response from the host of the managed object, establishing a semaphore within the central management system to temporarily inhibit connection creation,
      providing the encrypted response to a client-side device from the central management platform, the request having originated from the client-side device,
      receiving, from the client-side device, a plain-text value that is determined from the encrypted response using a private key provided at the client-side device, and
      releasing the semaphore to enable establishment of the connection by execution of one or more operations between the central management system, and the host based on the plain-text value;
   in response to establishment of the connection, requesting logon credentials from the client-side device; and
   facilitating logon of a user to the host based on the logon credentials to enable user access to the managed object.

2. The method of claim 1, wherein the request comprises a unique identifier assigned to the managed object and a process type.

3. The method of claim 1, further comprising determining a login method for the managed object based on a managed object model stored in the central management platform, the connection being established based on the login method.

4. The method of claim 1, wherein the encrypted response comprises a random number that is encrypted using a public key provided by the client-side device.

5. The method of claim 1, wherein establishing a connection between the central management platform and the host is at least partially performed by a session creator of the central management platform.

6. The method of claim 5, wherein the session creator selectively sets and releases the semaphore.

7. The method of claim 1, wherein authorization is delegated to an operating system for granting write access to a configuration of the central management platform.

8. A non-transitory computer-readable storage medium coupled to one or more processors and having instructions stored thereon which, when executed by the one or more processors, cause the one or more processors to perform operations for central management of multiple landscapes, the operations comprising:
  receiving, by a central management platform that is absent user management functionality, a request for access to a managed object of a landscape of a plurality of landscapes;
  in response to the request, establishing a connection between the central management platform, and a host of the managed object by:
    in response to receiving an encrypted response from the host of the managed object, establishing a semaphore within the central management system to temporarily inhibit connection creation,
    providing the encrypted response to a client-side device from the central management platform, the request having originated from the client-side device,
    receiving, from the client-side device, a plain-text value that is determined from the encrypted response using a private key provided at the client-side device, and
    releasing the semaphore to enable establishment of the connection by execution of one or more operations between the central management system, and the host based on the plain-text value;
  in response to establishment of the connection, requesting logon credentials from the client-side device; and
  facilitating logon of a user to the host based on the logon credentials to enable user access to the managed object.

9. The computer-readable storage medium of claim 8, wherein the request comprises a unique identifier assigned to the managed object and a process type.

10. The computer-readable storage medium of claim 8, wherein operations further comprise determining a login method for the managed object based on a managed object model stored in the central management platform, the connection being established based on the login method.

11. The computer-readable storage medium of claim 8, wherein the encrypted response comprises a random number that is encrypted using a public key provided by the client-side device.

12. The computer-readable storage medium of claim 8, wherein establishing a connection between the central management platform and the host is at least partially performed by a session creator of the central management platform.

13. The computer-readable storage medium of claim 12, wherein the session creator selectively sets and releases the semaphore.

14. The computer-readable storage medium of claim 9, wherein authorization is delegated to an operating system for granting write access to a configuration of the central management platform.

15. A system, comprising:
a computing device; and
a computer-readable storage device coupled to the computing device and having instructions stored thereon which, when executed by the computing device, cause the computing device to perform operations for central management of multiple landscapes, the operations comprising:
  receiving, by a central management platform that is absent user management functionality, a request for access to a managed object of a landscape of a plurality of landscapes;
  in response to the request, establishing a connection between the central management platform, and a host of the managed object by:
    in response to receiving an encrypted response from the host of the managed object, establishing a semaphore within the central management system to temporarily inhibit connection creation,
    providing the encrypted response to a client-side device from the central management platform, the request having originated from the client-side device,
    receiving, from the client-side device, a plain-text value that is determined from the encrypted response using a private key provided at the client-side device, and
    releasing the semaphore to enable establishment of the connection by execution of one or more operations between the central management system, and the host based on the plain-text value;
  in response to establishment of the connection, requesting logon credentials from the client-side device; and
  facilitating logon of a user to the host based on the logon credentials to enable user access to the managed object.

16. The system of claim 15, wherein the request comprises a unique identifier assigned to the managed object and a process type.

17. The system of claim 15, wherein operations further comprise determining a login method for the managed object based on a managed object model stored in the central management platform, the connection being established based on the login method.

18. The system of claim 15, wherein the encrypted response comprises a random number that is encrypted using a public key provided by the client-side device.

19. The system of claim 15, wherein establishing a connection between the central management platform and the host is at least partially performed by a session creator of the central management platform.

20. The system of claim 19, wherein the session creator selectively sets and releases the semaphore.

* * * * *